United States Patent
Takagi

(10) Patent No.: US 9,631,721 B2
(45) Date of Patent: Apr. 25, 2017

(54) OIL PRESSURE CONTROL APPARATUS

(71) Applicant: DENSO CORPORATION, Kariya, Aichi-pref. (JP)

(72) Inventor: Akira Takagi, Obu (JP)

(73) Assignee: DENSO CORPORATION, Kariya (JP)

( * ) Notice: Subject to any disclaimer, the term of this patent is extended or adjusted under 35 U.S.C. 154(b) by 19 days.

(21) Appl. No.: 14/802,191

(22) Filed: Jul. 17, 2015

(65) Prior Publication Data

US 2016/0033032 A1   Feb. 4, 2016

(30) Foreign Application Priority Data

Jul. 29, 2014   (JP) .................................. 2014-153761

(51) Int. Cl.
| | |
|---|---|
| F16H 61/00 | (2006.01) |
| F16H 61/12 | (2010.01) |
| F16H 59/68 | (2006.01) |
| F16H 59/74 | (2006.01) |
| F16H 61/02 | (2006.01) |

(52) U.S. Cl.
CPC ..... *F16H 61/0031* (2013.01); *F16H 61/0206* (2013.01); *F16H 61/12* (2013.01); *F16H 2059/683* (2013.01); *F16H 2059/746* (2013.01); *F16H 2061/0087* (2013.01); *F16H 2061/1212* (2013.01)

(58) Field of Classification Search
CPC .................................................. F16H 61/0031
See application file for complete search history.

(56) References Cited

U.S. PATENT DOCUMENTS

| | | |
|---|---|---|
| 6,679,800 B1 | 1/2004 | Ishii et al. |
| 2004/0122577 A1 | 6/2004 | Ford et al. |
| 2005/0064975 A1 | 3/2005 | Takagi et al. |
| 2011/0071740 A1* | 3/2011 | Nihei .................... F16D 48/066 701/54 |
| 2012/0062164 A1* | 3/2012 | Sano .................. F16H 61/0031 318/721 |

* cited by examiner

*Primary Examiner* — Tisha Lewis
(74) *Attorney, Agent, or Firm* — Nixon & Vanderhye P.C.

(57) ABSTRACT

Oil pressure is produced by an electrical pump during an engine operation is temporarily stopped according to an idling-stop function and respectively supplied to multiple electromagnetic valves. A command value for a drive current is supplied to each of a driver circuit in order to adjust the oil pressure to be outputted from the corresponding electromagnetic valve. Such adjusted oil pressure is applied to a corresponding gear-change element and an oil-pressure a detecting device detects the oil pressure applied to the gear-change element to obtain detection value for the oil pressure. A current-command characteristic for each of the electromagnetic valves is updated based on the command value of the drive current and the detection value of the oil pressure.

17 Claims, 8 Drawing Sheets

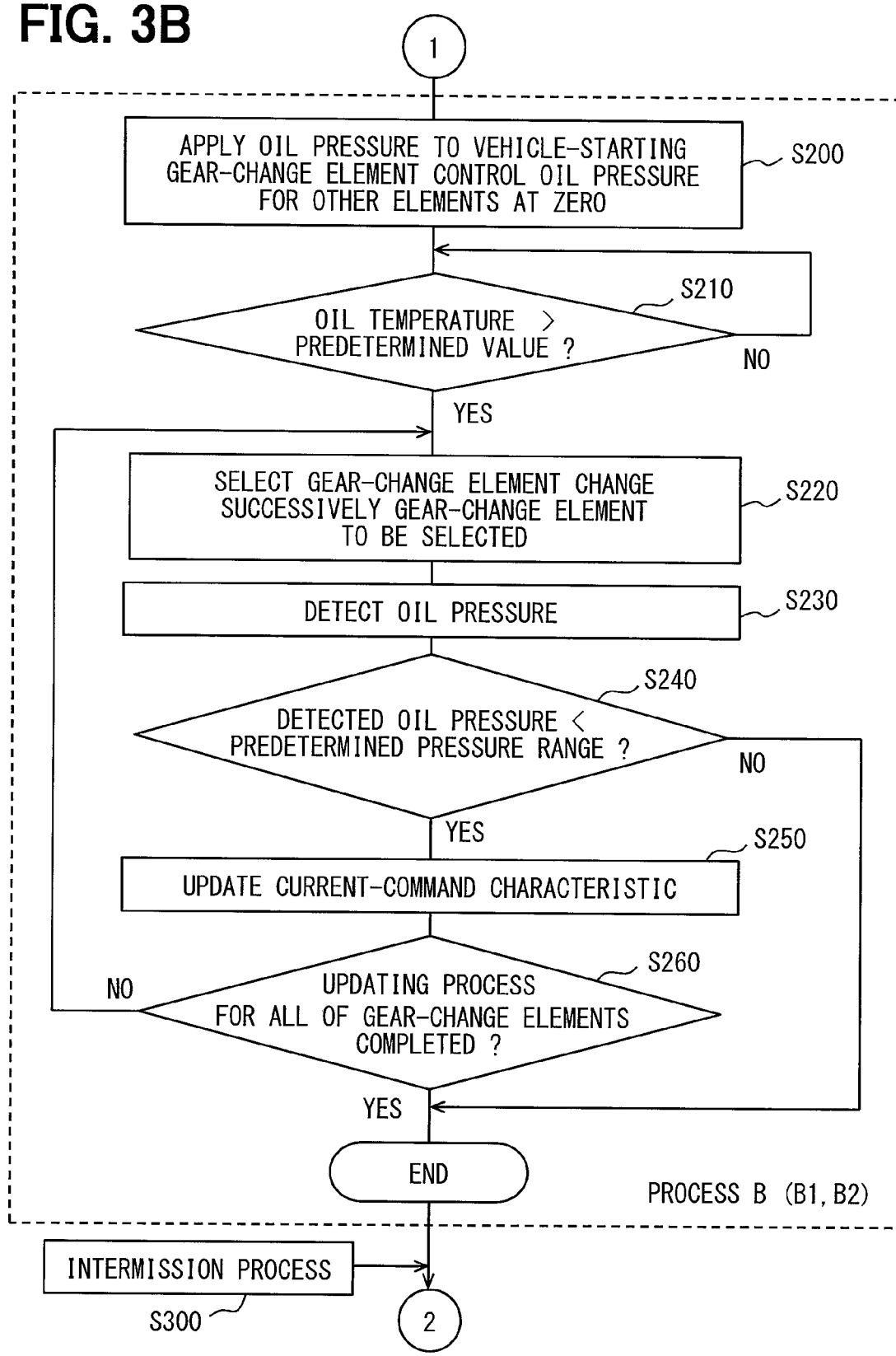

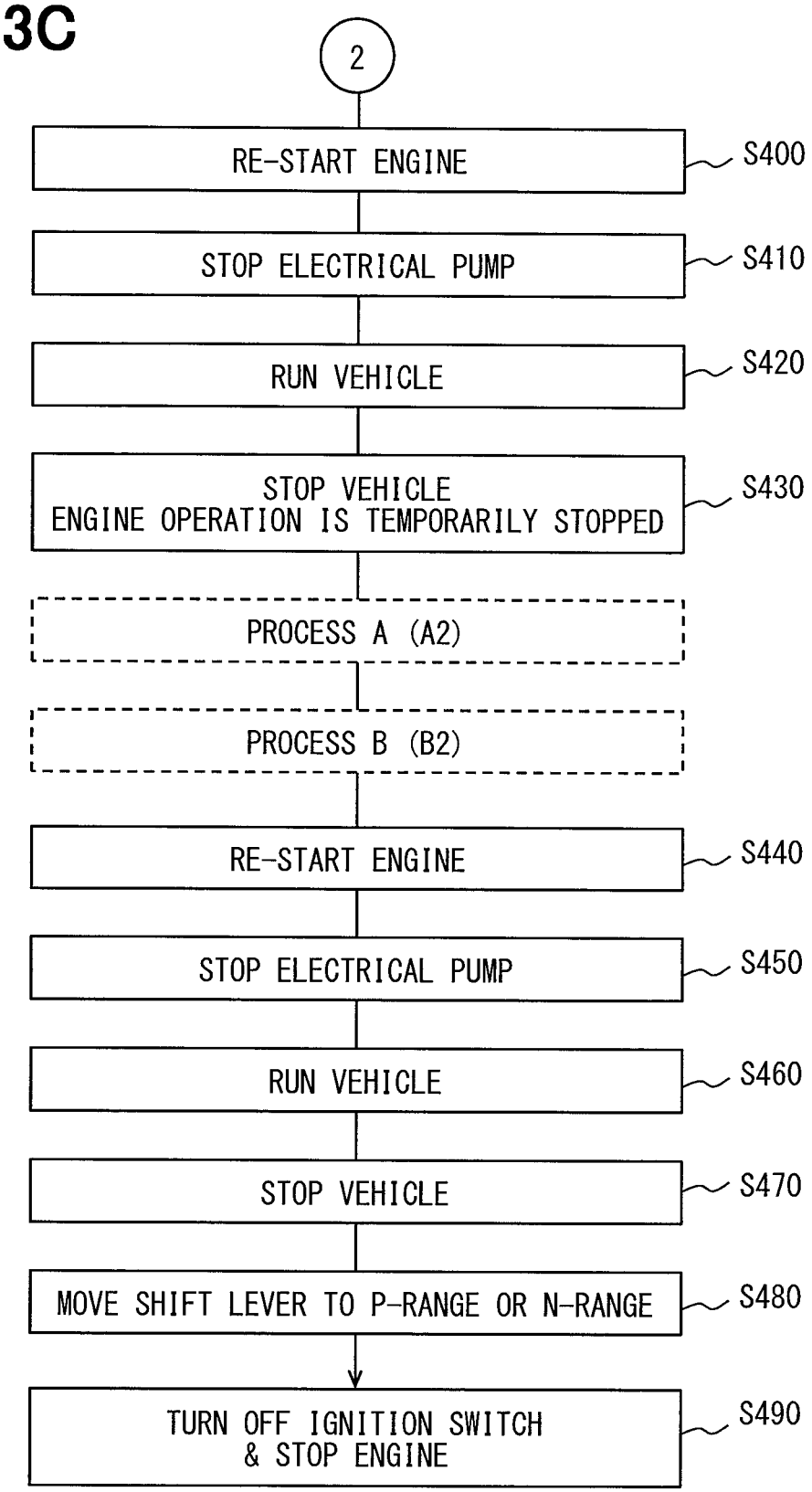

ENGINE ROTATIONAL SPEED
(M-PUMP ROTATIONAL SPEED)

E-PUMP ROTATIONAL SPEED

OIL PRESSURE
(VEHICLE-STARTING G.C. ELEMENT)

OIL PRESSURE
(FIRST SELECTED G.C. ELEMENT)

OIL PRESSURE
(SECOND SELECTED G.C. ELEMENT)

OIL PRESSURE DETECTED BY SENSOR

TIME t1 t2  t3      t4      t5 t6

OIL PRESSURE CONTROL APPARATUS

CROSS REFERENCE TO RELATED APPLICATION

This application is based on Japanese Patent Application No. 2014-153761 filed on Jul. 29, 2014, the disclosure of which is incorporated herein by reference.

FIELD OF TECHNOLOGY

The present disclosure relates to an oil pressure control apparatus for controlling oil pressure of working oil to be supplied to an automatic transmission apparatus for a vehicle.

BACKGROUND

A so-called "gear-change shock" has been a problem in a conventional automatic transmission apparatus installed in a vehicle. An impact is generated when a gear ratio is changed in the automatic transmission apparatus and a vehicle driver feels the impact as the gear-change shock. In a known oil pressure control apparatus for the automatic transmission apparatus, oil pressure of working oil which is supplied to respective gear-change elements for changing the gear ratio is changed in terms of time in accordance with a predetermined control pattern (also referred to as an oil pressure pattern) in order to reduce the gear-change shock.

In the known automatic transmission apparatus, the oil pressure control apparatus has a mechanical pump, electromagnetic valves, an electronic control unit (hereinafter also referred to as TCU "Transmission Control Unit") and so on.

The mechanical pump is driven by an internal combustion engine to generate oil pressure of working oil. The electromagnetic valve adjusts the oil pressure generated by the mechanical pump and outputs such adjusted oil pressure to gear-change elements of the automatic transmission apparatus. The TCU detects a vehicle condition based on signals from various kinds of sensors and controls various kinds of equipment related to an operation of the automatic transmission apparatus (including the electromagnetic valves) in accordance with such information relating to the vehicle condition. The TCU has a micro-computer and various kinds of driver circuits.

The TCU calculates command values for the oil pressure to be applied to the respective gear-change elements based on the oil pressure pattern. The TCU further calculates, based on the command values for the oil pressure, command values for drive currents to be supplied to respective driver circuits, which drive corresponding electromagnetic valves. The oil pressure is controlled when the drive current is supplied from the respective driver circuit to each of the electromagnetic valves. In addition, the TCU calculates the command values for the drive current based on a current-command characteristic, which is prepared in advance.

The current-command characteristic is a correlation between the command value for the drive current to be supplied to the driver circuit for driving the electromagnetic valve and the command value for the oil pressure to be applied to the gear-change element.

The current-command characteristic is prepared in advance, for example, in the following process. In an initial condition before shipping products from a factory, necessary data relating to the drive current and the oil pressure for each of the electromagnetic valves and the gear-change elements are collected by changing the command value for the drive current supplied from the TCU to the driver circuit for driving the electromagnetic valve and by detecting the oil pressure of the working oil applied to the gear-change element. The current-command characteristic is prepared based on the above data for each of the electromagnetic valves and the gear-change elements (for example, as disclosed in Japanese Patent Publication No. 2001-116130).

The gear-change shock is caused by the impact generated when changing the gear ratio. Therefore, the gear-change shock may be generated, even when a small pressure difference of "tens of kPa" is generated between an actual value of the oil pressure applied to the gear-change element and the command value for the oil pressure. It is, therefore, quite a challenging target to completely solve the problem of the gear-change shock.

With regard to the oil pressure applied to the gear-change elements, the pressure difference of "tens of kPa" between the actual value and the command value may be substantially generated because of the following reasons (the pressure difference is also referred to as a deviation of the oil pressure). Not only a correlation between a thrust force for a spool and an opening degree of a valve member in the electromagnetic valve but also a characteristic of electric circuits including a coil and a driver circuit of the electromagnetic valve is inevitably deteriorated with age due to its use, even though deterioration is small and the deterioration gradually goes. As a result of such inevitable deterioration with age, the pressure difference (the deviation of the oil pressure) of "tens of kPa" may be substantially generated.

It is, therefore, desired to take any possible measures to reduce the pressure difference (the deviation of the oil pressure) so as to suppress the gear-change shock, although it is difficult to completely eliminate the gear-change shock.

For example, a feedback of the oil pressure, an updating of the current-command characteristic or the like, as explained below, may be possible counter measures for reducing the pressure difference.

According to the above-mentioned feedback of the oil pressure, for example, the oil pressure outputted from the electromagnetic valve is detected by an oil-pressure sensor and feed-backed to the TCU in order to increase or decrease the command value for the drive current (for example, as disclosed in Japanese Patent Publication No. 2004-205044).

However, it is not avoidable that a response delay with respect to the command, which may be caused by viscosity of the working oil, is generated, even when the opening degree of the valve member of the electromagnetic valve is changed by increasing or decreasing the command value for the drive current. Accordingly, it is not possible to obtain a sufficient effect for reducing the pressure difference (the deviation of the oil pressure) by the feedback of the oil pressure.

According to the above-mentioned updating of the current-command characteristic, data relating to actual values of the oil pressure are obtained during an operation of the automatic transmission apparatus and the current-command characteristic is updated based on the above data and the command value for the drive current. The data relating to the actual values of the oil pressure include, for example, detection values of the oil-pressure sensor, in a case that the oil-pressure sensor is provided.

However, the data obtained during the operation of the automatic transmission apparatus are those data obtained when the automatic transmission apparatus is in its transit period. As a result, the updated current-command characteristic based on the actual values of the oil pressure in the transit period may become lower in its reliability.

In addition, since the detection values for the oil pressure are obtained during the operation of the engine, an un-intentional operation of the automatic transmission apparatus may be caused if the oil pressure of the working oil is changed. Therefore, it is not always a recommendable method.

In addition, in a case that a shift range position is in an N-range or a P-range, the oil pressure is generally not applied to the electromagnetic valve. Therefore, it is not possible to obtain the data relating to the actual values of the oil pressure in such shift range positions.

SUMMARY OF THE DISCLOSURE

The present disclosure is made in view of the above problem. It is an object of the present disclosure to provide an oil pressure control apparatus, which controls oil pressure of working oil to be supplied to gear-change elements of an automatic transmission apparatus for a vehicle. According to the oil pressure control apparatus of the present disclosure, a pressure difference between a command value for the oil pressure of the working oil applied to the gear-change element and an actual value for the oil pressure is not increased, even when the oil pressure control apparatus is inevitably deteriorated with age. A gear-change shock can be thereby reduced.

According to a feature of the present disclosure, the oil pressure control apparatus controls the oil pressure of the working oil to be supplied to the gear-change elements of the automatic transmission apparatus installed in the vehicle. The oil pressure control apparatus is composed of a mechanical pump, electromagnetic valves respectively connected to each of the gear-change elements, an oil-pressure command portion, a drive-current command portion, a second oil-pressure source (for example, an electrical pump), an oil-pressure detecting device and so on.

The mechanical pump is driven by an engine in order to produce the oil pressure of the working oil. Each of the electromagnetic valves adjusts the oil pressure to be applied to the corresponding gear-change element.

The oil-pressure command portion obtains a command value for the oil pressure to be applied to each of the gear-change elements.

The drive-current command portion has a current-command characteristic for each of the electromagnetic valves and calculates a command value for a drive current by applying the command value for the oil pressure to the current-command characteristic. Then, the drive-current command portion supplies the calculated command value for the drive current to a driver circuit, which supplies the drive current to the electromagnetic valve so as to drive it.

The above current-command characteristic corresponds to a correlation between the drive current to be supplied to the driver circuit for driving the electromagnetic valve and the command value for the oil pressure to be applied to the gear-change element.

The second oil-pressure source (for example, the electrical pump) is a device different from the mechanical pump and produces the oil pressure without depending on rotation of the engine, in order to supply the oil pressure to the electromagnetic valves during the engine is stopped.

The oil-pressure detecting device detects the oil pressure applied to the gear-change elements.

The oil pressure control apparatus produces the oil pressure by the second oil-pressure source during the engine is stopped, so that the oil pressure is supplied to the electromagnetic valves. At the same time, the command value for the drive current is given to the driver circuit so that the corresponding electromagnetic valve adjusts the oil pressure outputted therefrom in accordance with the command value for the drive current. The oil pressure applied to the gear-change elements is detected by the oil-pressure detecting device so that detection value for the oil pressure is obtained. Then, the current-command characteristic is updated based on the command value for the drive current and the detection value for the oil pressure.

According to the above feature, it is possible to collect data relating to the command value for the drive current and the detection value for the oil pressure by use of the second oil-pressure source and the oil-pressure detecting device during the engine is stopped. And thereby, it becomes possible to update the current-command characteristic based on the collected data, even during the engine is stopped.

In addition, since the data collected during the engine is stopped correspond to such data which are obtained in a static condition of the automatic transmission apparatus and the engine, it is possible to increase reliability of the current-command characteristic which is updated based on the above data.

Accordingly, the deviation of the oil pressure can be suppressed to a smaller value and thereby the gear-change shock is suppressed to a smaller value, even when the oil pressure control apparatus (any parts and/or components thereof) is inevitably deteriorated with age due to its use. This is because the data relating to the command value for the drive current and the detection value for the oil pressure are collected during the engine is stopped and the current-command characteristic is updated based on such date.

In addition, it is possible to securely obtain the data relating to the command value for the drive current and the detection value for the oil pressure without causing an un-intentional power transmission of the automatic transmission apparatus, because the data are collected during the engine is stopped.

According to the present disclosure, it is possible to produce the oil pressure and to apply the oil pressure to the electromagnetic valves, even when the engine is temporarily stopped as a result of an idling-stop function, wherein a gear-change position is maintained at a shift position of a D-range (or an R-range). As above, it is also possible to collect the data during the engine is temporarily stopped.

According to another feature of the present disclosure, the oil pressure control apparatus has multiple gear-change elements and multiple electromagnetic valves respectively connected to the gear-change elements. Therefore, the current-command characteristic is set to each pair of the gear-change element and the electromagnetic valve.

A hydraulic circuit is formed in order to supply the oil pressure from the second oil-pressure source to each of the electromagnetic valves. Multiple oil-pressure selecting devices (for example, a shuttle ball valve) are provided in the hydraulic circuit in order to compare the oil pressures to be respectively applied to two of the multiple gear-change elements and to select one of the oil pressures, which is higher than the other. The oil pressure selected by the oil-pressure selecting device is supplied to the oil-pressure detecting device.

The oil-pressure selecting device is composed of two inlet ports, an outlet port, a valve member and so on. The oil pressures to be applied to the different gear-change elements are respectively introduced to each of the inlet ports. The oil pressure selected by the oil-pressure selecting device is outputted therefrom through the outlet port. Each of the oil pressures introduced to the respective inlet ports is applied to the valve member in different directions from each other.

The valve member is moved by a pressure difference between the introduced two oil pressures and the oil pressure higher than the other is selected and outputted from the outlet port.

According to the above structure, it is possible to detect by one detecting device the oil pressure applied to two of the gear-change elements. In other words, one detecting device is commonly used for detecting the oil pressure to be applied to the two gear-change elements. It is, therefore, possible to reduce a number of the detecting devices.

According to a further feature of the present disclosure, multiple oil-pressure selecting devices are provided in the hydraulic circuit of the oil pressure control apparatus in order to select the oil pressure, which is highest among the oil pressures to be respectively applied to the multiple gear-change elements, and such selected oil pressure (of the highest oil pressure) is introduced to the oil-pressure detecting device.

According to the above feature, it is possible to detect by one detecting device the oil pressures to be applied to the multiple gear-change elements. In other words, one detecting device is commonly used for detecting the oil pressure to be applied to the multiple gear-change elements. It is, therefore, possible to further reduce a number of the detecting devices.

BRIEF DESCRIPTION OF THE DRAWINGS

The above and other objects, features and advantages of the present disclosure will become more apparent from the following detailed description made with reference to the accompanying drawings. In the drawings:

FIGS. 3A to 3C are flowcharts, according to which the oil pressure control apparatus of the embodiment is operated;

FIGS. 4A to 4F are time-charts showing a change of oil pressure detected by an oil-pressure sensor and so on;

DETAILED DESCRIPTION OF THE EMBODIMENTS

Figure 1:
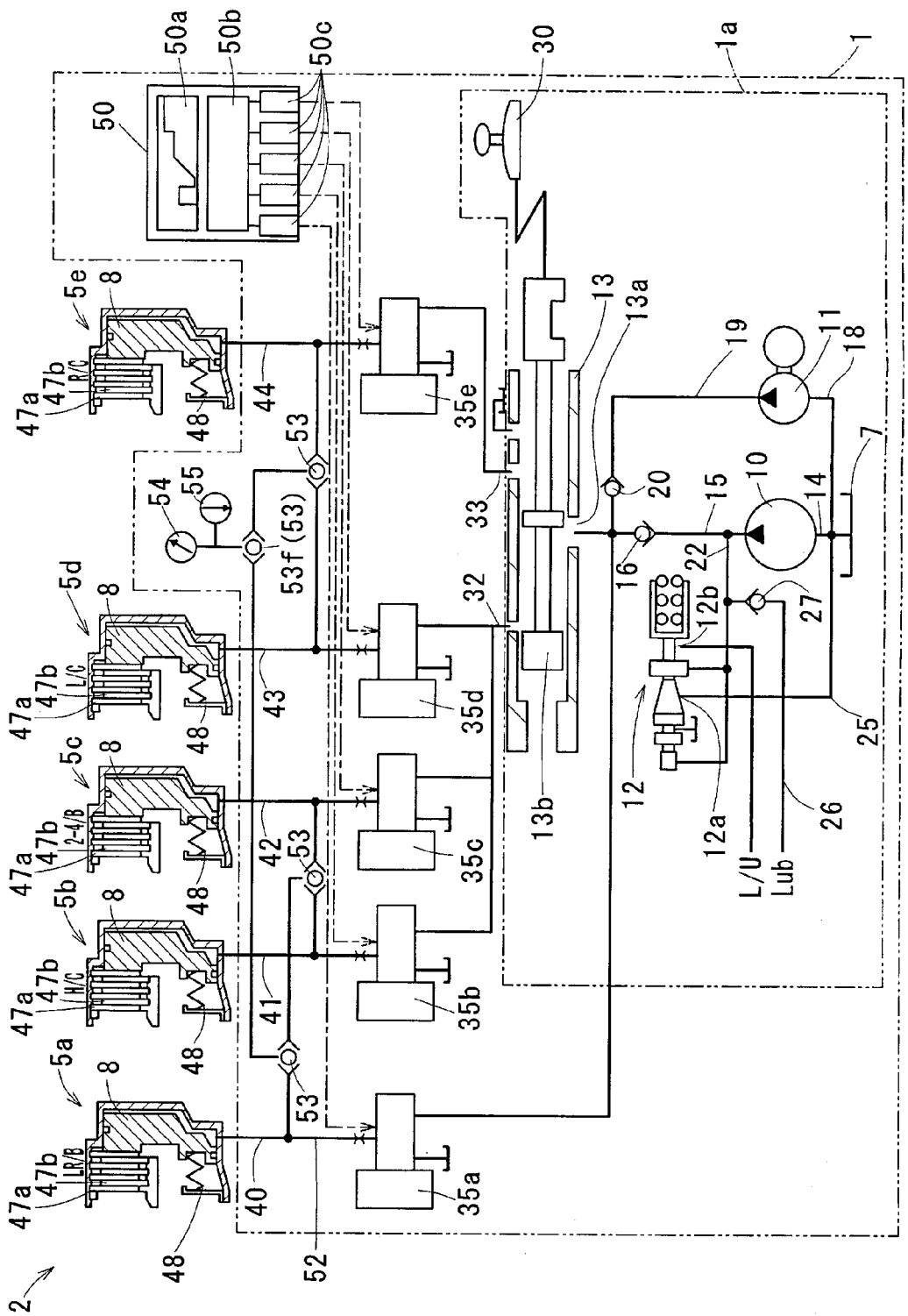
FIG. 1 is a schematic diagram showing a structure of an automatic transmission apparatus, to which an oil pressure control apparatus of an embodiment of the present disclosure is applied.

The present disclosure will be explained hereinafter by way of multiple embodiments and/or modifications with reference to the drawings. The same reference numerals are given to the same or similar structure and/or portion in order to avoid repeated explanation.
(Embodiment)

An automatic transmission apparatus 2 for a vehicle, to which an oil pressure control apparatus 1 is applied, is shown in FIG. 1. An idling-stop control system is installed in the vehicle having the automatic transmission apparatus 2.

According to the idling-stop control system, an operation of an internal combustion engine (not shown; hereinafter, the engine) is temporarily stopped, when a position of a D-range (a drive range for a vehicle forward travel) is selected as a gear-change position and a vehicle speed is lower than a predetermined value.

In the present embodiment, the idling-stop control system also includes such a vehicle control mode, according to which the engine operation is temporarily stopped when a position of an R-range (a rear-drive range for a vehicle backward travel) is selected as the gear-change position and the vehicle speed is lower than the predetermined value.

The automatic transmission apparatus 2 is a multistage transmission apparatus, which is composed of a torque converter (not shown) connected to a crank shaft (not shown) of the engine, a speed change gear (not shown) of a planetary gear train type, multiple gear-change elements $5a$ to $5e$ for changing speed of the speed change gear, the oil pressure control apparatus 1 and so on.

The speed change gear has multiple planet gear trains (not shown). Each of the gear-change elements $5a$ to $5e$ transmits torque of a rotation element (such as, a sun gear, a carrier, a ring gear and so on) of the planetary gear train to another rotation element of the other planetary gear train or to a transmission case or the like.

Each of the gear-change elements $5a$ to $5e$ is composed of, for example, a wet-type multi-disc clutch unit or a wet-type multi-disc braking unit. The automatic transmission apparatus 2 controls engagements and/or dis-engagements of the gear-change elements $5a$ to $5e$ in order to change a power transmission path between a turbine shaft (not shown) and an output shaft (not shown) of the torque converter, so that one of the multiple gear-change stages is established.

The oil pressure control apparatus 1 has an oil-pressure supplying portion $1a$ for supplying oil pressure of working oil to each of components constituting the automatic transmission apparatus 2.

The oil-pressure supplying portion $1a$ pumps up the working oil from an oil pan 7 and supplies the working oil to a piston 8 of each gear-change element $5a$ to $5e$ and to the torque converter.

The oil-pressure supplying portion $1a$ is composed of a mechanical pump 10, an electrical pump 11 (a second oil-pressure source for producing the oil pressure), a line pressure control valve 12, a manual valve 13 (a shift-range selecting portion) and so on.

The mechanical pump 10 is driven by the engine so as to be rotated together with rotation of the engine. The mechanical pump 10 pumps up the working oil pooled in the oil pan 7 via an oil passage 14. The mechanical pump 10 sucks the working oil through an inlet port thereof connected to the oil passage 14, pressurizes the working oil within the pump and discharges the pressurized working oil from an outlet port into an oil passage 15.

The oil passage 15 connects the outlet port of the mechanical pump 10 to an inlet port $13a$ of the manual valve 13. The working oil discharged from the mechanical pump 10 is supplied to the inlet port $13a$ via the oil passage 15.

A check valve 16, which is provided in the oil passage 15, allows a flow of the working oil from the mechanical pump 10 to the manual valve 13 but prohibits a reverse flow of the working oil from the manual valve 13 to the mechanical pump 10.

The electrical pump 11 is another source for producing the oil pressure in addition to the mechanical pump 10. The electrical pump 11, which is driven by an electric motor rotated by electric power, produces the oil pressure without depending on the rotation of the engine. The electrical pump 11 pumps up the working oil from the oil pan 7 through an oil passage 18. The electrical pump 11 sucks the working oil through an inlet port thereof connected to the oil passage 18, pressurizes the working oil within the pump and discharges the pressurized working oil from its outlet port into an oil passage 19.

The oil passage 19 connects the outlet port of the electrical pump 11 to the oil passage 15 between the check valve 16 and the manual valve 13. The working oil discharged from the electrical pump 11 is supplied to the inlet port 13a of the manual valve 13 via the oil passages 19 and 15.

A check valve 20, which is provided in the oil passage 19, allows a flow of the working oil from the electrical pump 11 to the manual valve 13 but prohibits a reverse flow of the working oil from the manual valve 13 to the electrical pump 11.

The line pressure control valve 12, which is a pressure control valve of a pilot type, is connected to a first bifurcated oil passage 22 bifurcated from the oil passage 15 between the mechanical pump 10 and the check valve 16. The line pressure control valve 12 controls the oil pressure of the working oil (which is also referred to as a line pressure) to be supplied to the manual valve 13.

A spool of the line pressure control valve 12 is moved back and forth depending on a balance among a biasing force of a spring, a force received from the working oil from the first bifurcated oil passage 22 and a force received from the working oil, which is controlled by an electromagnetic valve (not shown) operated in accordance with a load of the automatic transmission apparatus 2. The spool of the line pressure control valve 12 opens or closes a relief port 12a depending on a movement of the spool.

When the oil pressure of the working oil discharged from the mechanical pump 10 or the electrical pump 11 is higher than a predetermined value, a surplus amount of the working oil is returned from the relief port 12a to the oil pan 7 via an oil passage 25.

The working oil discharged from another relief port 12b of the line pressure control valve 12 is supplied to a lock-up circuit of the torque converter.

A second bifurcated oil passage 26, which is bifurcated from the first bifurcated oil passage 22, is connected to a lubricating portion for supplying the working oil to the respective components as lubricating oil. A check valve 27 is provided in the second bifurcated oil passage 26.

A shift-range selecting lever 30 is operated by a vehicle driver, so that the shift-range selecting lever 30 is moved to one of gear-change positions. The gear-change positions include the D-range for the vehicle forward travel, a P-range for parking, the R-range for the vehicle backward travel, and an N-range of a neutral position for cutting off a power transmission. A spool 13b of the manual valve 13 is mechanically or electrically connected to the shift-range selecting lever 30 so that the spool 13b is moved depending on the gear-change position selected by the shift-range selecting lever 30.

When the shift-range selecting lever 30 is moved to the gear-change position of the D-range, the manual valve 13 connects the oil passage 15 to a forward-travel oil passage 32 and cuts off communication between the oil passage 15 and a backward-travel oil passage 33. Then, the working oil from the oil passage 15 (or the oil passage 19) is supplied, via the forward-travel oil passage 32, to each of electromagnetic valves 35b, 35c and 35d , which are respectively connected to the forward-travel gear-change elements 5b, 5c and 5d.

The forward-travel gear-change elements 5b to 5d correspond to those gear-change elements for establishing a power transmission mode of a vehicle forward movement, when the oil pressure is supplied to those gear-change elements via the forward-travel oil passage 32.

When the shift-range selecting lever 30 is moved to the gear-change position of the R-range, the manual valve 13 connects the oil passage 15 (or the oil passage 19) to the backward-travel oil passage 33 and cuts off the communication between the oil passage 15 (or the oil passage 19) and the forward-travel oil passage 32. Then, the working oil from the oil passage 15 (or 19) is supplied, via the backward-travel oil passage 33, to an electromagnetic valve 35e, which is connected to the backward-travel gear-change element 5e.

The backward-travel gear-change element 5e corresponds to the gear-change element for establishing a power transmission mode of a vehicle backward movement, when the oil pressure is supplied to the gear-change element via the backward-travel oil passage 33.

When the shift-range selecting lever 30 is moved to the gear-change position of the P-range or the N-range, each of the communication between the oil passage 15 and the forward-travel oil passage 32 and the communication between the oil passage 15 and the backward-travel oil passage 33 is cut off.

The working oil of the oil passage 15 or 19 is directly supplied, without passing through the manual valve 13, to an electromagnetic valve 35a connected to the gear-change element 5a. The gear-change element 5a is composed of the wet-type multi-disc braking unit. When the shift-range selecting lever 30 is moved to the operating position of the D-range, the gear-change element 5a and the gear-change element 5d work together, in order to generate an engine brake. The gear-change element 5a and the backward-travel gear-change element 5e work together, when the shift-range selecting lever 30 is moved to the gear-change position of the R-range. Then, the gear-change stage for the vehicle backward travel is established. The gear-change element 5a is also referred to as a braking gear-change element.

The electromagnetic valves 35b, 35c and 35d are provided for each of the forward-travel gear-change elements 5b, 5c and 5d. Which of the forward-travel gear-change elements 5b, 5c and 5d should be engaged is decided for each of the multiple gear-change stages. The electromagnetic valve 35e is provided for the backward-travel gear-change element 5e. The electromagnetic valve 35a is provided for the braking gear-change element 5a.

As above, each of the electromagnetic valves 35a to 35e is connected to the corresponding gear-change element 5a to 5e via respective oil passages 40 to 44.

Each of the electromagnetic valves 35a to 35e is an oil pressure control valve of a spool-valve type, so that the output oil pressure is continuously changed. Each of the electromagnetic valves 35a to 35e controls the output oil pressure depending on a balance between an electromagnetic thrust force generated depending on a drive current from a control unit (the TCU 50) and a static oil pressure introduced from the output oil pressure.

Each of the electromagnetic valves 35a to 35e receives the working oil directly or via the manual valve 13 from the oil passage 15 (or the oil passage 19) through the forward-travel oil passage 32 or the backward-travel oil passage 33. Then, each of the electromagnetic valves 35a to 35e adjusts the oil pressure of the working oil to be outputted therefrom and supplies the working oil to the piston 8 of the respective gear-change elements 5a to 5e.

In each of the gear-change elements 5a to 5e, to which the working oil is supplied from the corresponding electromagnetic valve 35a to 35e, the piston 8 is operated by the working oil so as to push multiple friction elements 47a and 47b in a direction of engaging them with each other. A return spring 48 is provided in each of the gear-change elements 5a to 5e in order to bias the piston 8 in a direction of disengaging the friction elements 47a and 47b from each other. Accordingly, it is possible to control the engagement and dis-engagement of the gear-change elements 5a to 5e by controlling the output oil pressure from the electromagnetic valves 35a to 35e.

The TCU 50 is composed of an oil-pressure command portion 50a, a drive-current command portion 50b, multiple driver circuits 50c (a drive portion) for driving the respective electromagnetic valves 35a to 35e and so on.

In the automatic transmission apparatus 2, the oil pressure to be applied to the respective gear-change elements 5a to 5e is changed in accordance with a predetermined oil pressure pattern, in order to reduce the gear-change shock generated when driving the gear-change elements 5a to 5e for changing the gears.

The oil-pressure command portion 50a calculates a command value for the oil pressure to be applied to each of the gear-change elements 5a to 5e in accordance with the predetermined oil pressure pattern.

The drive-current command portion 50b obtains a command value for the drive current to be supplied to each of the electromagnetic valves 35a to 35e by applying the command value for the oil pressure to a corresponding current-command characteristic. Each of the command values for the drive current is given to the corresponding driver circuit 50c.

Each of the driver circuits 50c, which is composed of electric circuits having transistors and so on, supplies to the corresponding electromagnetic valve 35a to 35e an actual drive current corresponding to the command value for the drive current from the drive-current command portion 50b. However, the command value for the drive current and the actual drive current supplied to the electromagnetic valve do not always coincide with each other because of deterioration of the electric circuit with age.

Each of the driver circuits 50c is provided for each of the electromagnetic valves 35a to 35e, so that the TCU 50 can supply different command values for the drive current to the respective driver circuits 50c. Therefore, each of the driver circuits 50c supplies the actual drive current to the corresponding electromagnetic valve 35a to 35e, wherein the actual drive current to one of the electromagnetic valves may be, or may not be, different from that to another electromagnetic valve.

The current-command characteristic is a correlation between the command value for the drive current to be supplied to the driver circuit 50c and the command value for the oil pressure to be applied to the electromagnetic valve. The current-command characteristic is prepared in advance for each pair of the gear-change elements 5a to 5e and the electromagnetic valves 35a to 35e.

The current-command characteristic in an initial condition is prepared, for example, by the following method. Multiple command values for the drive current supplied to the driver circuit 50c and multiple oil pressures applied to the gear-change element are detected. And average values for the respective command values for the drive current and the oil pressure are calculated to obtain the current-command characteristic.

The method for preparing the current-command characteristic in the initial condition is not limited to the above explained method. For example, in the initial condition before a product shipment, the command value for the drive current to each of the driver circuits 50c may be changed and the oil pressures applied to each of the gear-change elements 5a to 5e are detected to obtain data for preparing the current-command characteristic.

According to the present embodiment, multiple shuttle ball valves 53 are provided in a hydraulic circuit 52, through which the oil pressure is supplied from the mechanical pump 10 or the electrical pump 11 to the respective gear-change elements 5a to 5e. The shuttle ball valve 53 is also referred to as an oil-pressure selecting device.

Figure 2A:
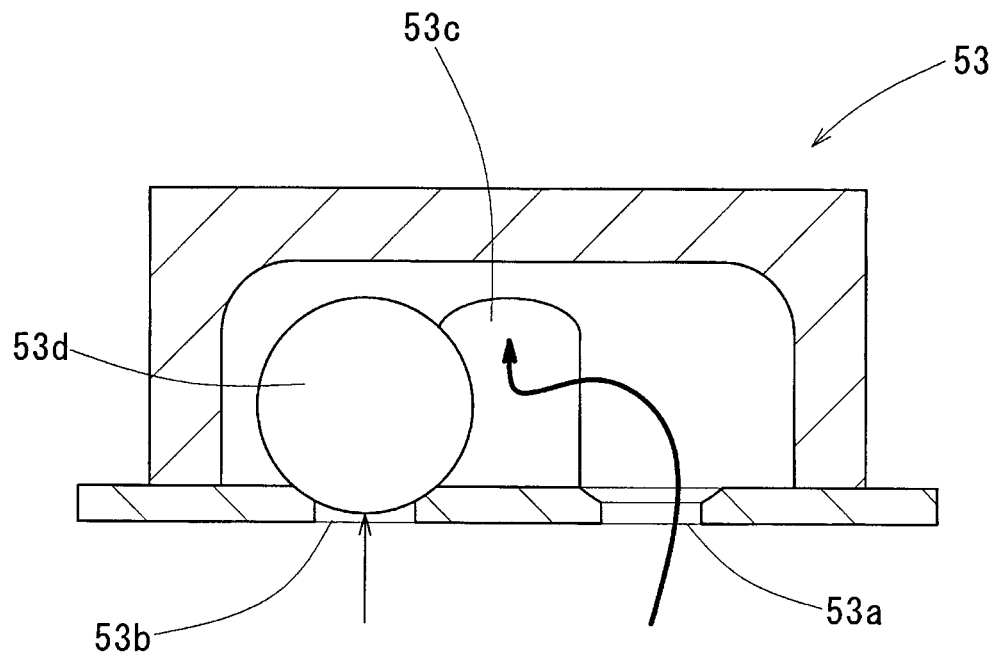
FIGS. 2A and 2B are schematic cross sectional views for explaining an operation of a shuttle ball valve of the embodiment.
Figure 2B:
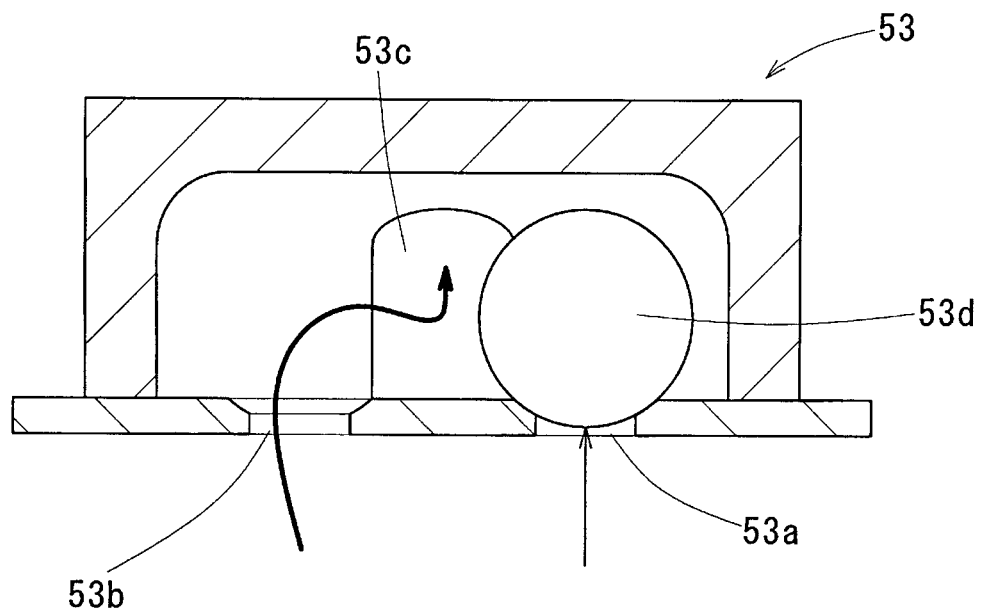

A structure of the shuttle ball valve 53 is shown in FIGS. 2A and 2B. As shown in the drawings, the shuttle ball valve 53 has two inlet ports 53a and 53b, through which the working oil enters inside of a valve housing. In the shuttle ball valve 53, the working oil having the oil pressure higher than that of the other working oil is selected. The selected working oil having the higher oil pressure is discharged from an outlet port 53c.

More exactly, a valve member 53d of a ball shape is movably accommodated in the valve housing, wherein the oil pressure of the working oil from each of the inlet ports 53a and 53b is respectively applied to the valve member 53d in a different direction from each other. The valve member 53d is moved by a pressure difference between the working oil from the inlet port 53a and the working oil from the other inlet port 53b. As a result, one of the inlet ports 53a or 53b, the oil pressure of which is lower than the other, is closed by the valve member 53d. And the other inlet port (53a or 53b), the oil pressure of which is higher than the one inlet port, is opened. Accordingly, the working oil selected by the shuttle ball valve 53 is discharged from the outlet port 53c.

The multiple shuttle ball valves 53 are arranged in a so-called tournament choice structure in the hydraulic circuit 52. The shuttle ball valve 53 arranged in a final stage is indicated by a reference numeral 53f in FIG. 1. As shown in FIG. 1, there are three other shuttle ball valves 53 that precede shuttle ball valve 53f in the tournament choice structure. Namely, there is a shuttle ball valve 53 between electromagnetic valve 35b and electromagnetic valve 35c, such that the higher pressure of electromagnetic valve 35b and electromagnetic valve 35c is selected. There is a shuttle ball valve 53 between electromagnetic valve 35d and electromagnetic valve 35e, such that the higher pressure of electromagnetic valve 35d and electromagnetic valve 35e is selected. There is a shuttle ball valve 53 between electromagnetic valve 35a and the shuttle ball valve that selects the higher pressure of electromagnetic valve 35b and electromagnetic valve 35c, such that the highest pressure of electromagnetic valves 35a, 35b, and 35c is selected. The final shuttle ball valve 53 (i.e., shuttle ball valve 53f) is between the shuttle ball valve that selects the highest pressure of electromagnetic valves 35a, 35b, and 35c and the shuttle ball valve that selects the higher pressure of electromagnetic valves 35d and 35e, such that the highest pressure of electromagnetic valves 35a, 35b, 35c, 35d, and 35e is selected. The shuttle ball valve 53f is also referred to as the shuttle ball valve of a most-downstream side. An oil-pressure detecting device 54 and an oil-temperature detecting device 55 are connected to the outlet port 53c of the shuttle ball valve 53f of the final stage. According to the tournament choice structure, maximum oil pressure out of the oil pressures applied to the gear-change elements 5a to 5e is picked out and the maximum oil pressure is detected by the oil-pressure detecting device 54.

More exactly, the oil pressure of the oil passage 41 and the oil pressure of the oil passage 42 are compared by the shuttle ball valve 53. Then, the oil pressure selected by the shuttle ball valve 53 and the oil pressure of the oil passage 40 are compared by the other shuttle ball valve 53. The oil pressure higher than the other is then supplied to the shuttle ball valve 53*f* of the final stage.

In a similar manner, the oil pressure of the oil passage 43 and the oil pressure of the oil passage 44 are compared by the shuttle ball valve 53. Then, the oil pressure higher than the other is supplied to the shuttle ball valve 53*f* of the final stage.

The oil pressure higher than the other is selected by the shuttle ball valve 53*f* of the final stage. The oil pressure selected by the shuttle ball valve 53*f* of the final stage corresponds to the maximum oil pressure among the oil pressures of the oil passages 40 to 44, namely the maximum oil pressure among the oil pressures applied to the gear-change elements 5*a* to 5*e*. The maximum oil pressure is outputted from the outlet port 53*c* of the shuttle ball valve 53*f* and applied to the oil-pressure detecting device 54.

An operation of the oil pressure control apparatus 1 of the present disclosure will be explained with reference to flow-charts shown in FIGS. 3A to 3C.

Figure 3A:
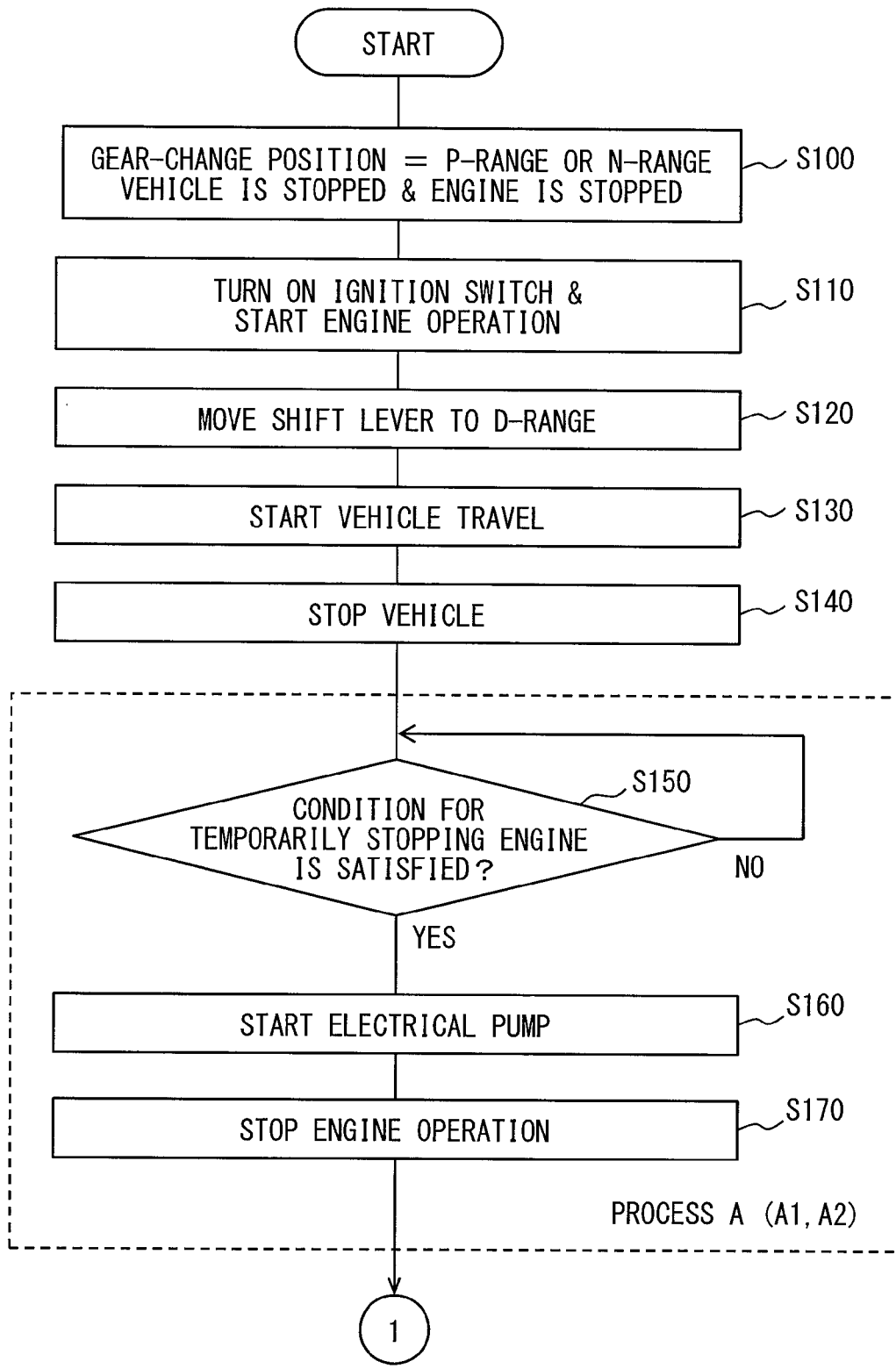

At a step S100 of FIG. 3A, the shift-range selecting lever 30 is moved by the vehicle driver to and held at the gear-change position of the P-range or the N-range. Therefore, an operation of the engine is stopped and the vehicle is stopped.

At a step S110, an ignition switch is turned on by the vehicle driver so as to start the engine operation. Then, the process goes to a step S120.

At the step S120, the shift-range selecting lever 30 is moved by the vehicle driver to the gear-change position of the D-range. The process goes to a step S130, at which the vehicle starts its movement in a forward direction.

At a step S140, the vehicle is stopped by the vehicle driver.

At a step S150, the TCU (or an engine control unit (not shown) different from the TCU) determines, based on the idling-stop function, whether a condition for temporarily stopping the engine operation is satisfied or not. When the above condition is satisfied, the process goes to a step S160. When the above condition is not satisfied, the step S150 is repeatedly carried out.

At the step S160, an operation of the electrical pump 11 is started by the TCU (or the engine control unit). Then, the process goes to a step S170 at which the engine operation is stopped. Then, the process further goes to a step S200 (FIG. 3B).

The above steps S150 to S170 are collectively referred to a process A, which is carried out by the TCU or the engine control unit (the ECU).

The automatic transmission apparatus 2 has the forward-travel gear-change element 5*d*, which is operated when the vehicle starts its forward movement from its stopped condition. Therefore, the forward-travel gear-change element 5*d* is hereinafter also referred to as a vehicle-starting gear-change element 5*d*.

The vehicle-starting gear-change element 5*d* has the piston 8 and the return spring 48.

In the step S200, the oil pressure applied to the piston 8 of the vehicle-starting gear-change element 5*d* is set at such a value, which is not smaller than an initial spring force of the return spring 48 during the vehicle stopped condition. The initial spring force of the return spring 48 corresponds to a biasing force of the return spring 48, which is applied to the piston 8 when the oil pressure from the electromagnetic valve 35*d* for the vehicle forward movement is not applied to the vehicle-starting gear-change element 5*d*.

In this step, the oil pressure for the other gear-change elements 5*a*, 5*b*, 5*c* and 5*e* than the vehicle-starting gear-change element 5*d* is zero. Then, the process goes to a step S210.

At the step S210, the TCU 50 determines whether the oil temperature of the working oil is higher than a predetermined value or not. When the oil temperature is higher than the predetermined value, the process goes to a step S220. In case of NO at the step S210, the determination process at the step S210 is repeatedly carried out.

At the step S220, the following process is carried out.

One of the gear-change elements 5*a* to 5*e* is selected. During the engine operation is stopped, the oil pressure to be applied to the selected gear-change element (one of 5*a* to 5*e*) is made larger than the oil pressure applied to the other gear-change elements than the selected one.

The gear-change element to be selected is sequentially changed to the different gear-change element in an order of frequency in use.

After the above process is carried out, the process goes to a step S230.

At the step S230, the following process is carried out.

During the engine operation is stopped, the electrical pump 11 is operated to produce the oil pressure, so that the oil pressure is supplied to the electromagnetic valve (one of 35*a* to 35*e*) connected to the selected gear-change element (one of 5*a* to 5*e*). The electromagnetic valve connected to the selected gear-change element is also referred to as the selected electromagnetic valve.

In addition, the command value for the drive current is supplied from the drive-current command portion 50*b* to the driver circuit 50*c* corresponding to the selected electromagnetic valve (one of 35*a* to 35*e*), so that the oil pressure is produced and adjusted at the selected electromagnetic valve in accordance with the actual drive current, which is generated in the driver circuit 50*c* based on the command value for the drive current from the drive-current command portion 50*b*. The oil pressure is supplied from the selected electromagnetic valve (one of 35*a* to 35*e*) to the selected gear-change element (one of 5*a* to 5*e*). The oil pressure applied to the selected gear-change element is detected by the oil-pressure detecting device 54. Accordingly, a detection value for the oil pressure is obtained.

The command value for the drive current, which is supplied from the drive-current command portion 50*b* to the driver circuit 50*c* for driving the selected electromagnetic valve (one of 35*a* to 35*e*) during the stop of the engine operation, is changed in terms of time. The detection value for the oil pressure is monotonically (for example, linearly) increased or decreased in terms of time.

A change rate in terms of time of the detection value for the oil pressure, which is monotonically (for example, linearly) increased or decreased, is smaller than a predetermined value.

In addition, the oil pressure to be applied to the selected gear-change element is adjusted by the selected electromagnetic valve so that the oil pressure is finally adjusted to zero.

After the above process is carried out, the process goes to a step S240.

At the step S240, the TCU 50 determines whether the detection value for the oil pressure is within a predetermined pressure range or not. When the detection value for the oil pressure is out of the predetermined pressure range, the TCU determines that a malfunction has occurred in any part or component for the automatic transmission apparatus 2 and the process goes to an end. In such a case, although not shown in FIG. 3B, an appropriate process is carried out for dealing with such malfunction. A detailed explanation is omitted here.

When the detection value for the oil pressure is within the predetermined pressure range, the process goes to a step S250.

At the step S250, the current-command characteristic for the selected gear-change element is updated based on the command value for the drive current and the detection value for the oil pressure.

Then, the process goes to a step S260, at which the TCU 50 determines whether the current-command characteristic is updated for all of the gear-change elements 5a to 5e.

When the current-command characteristic is updated for all of the gear-change elements 5a to 5e, the process goes to the end. When the engine operation is re-started thereafter, the process goes to a step S400 (FIG. 3C).

When the current-command characteristic is not updated for all of the gear-change elements 5a to 5e, the process goes back to the step S220 so that the above steps S220 to S250 are repeated.

The above steps S200 to S260 are collectively referred to as a process B, which is carried out by the TCU 50 or which may be partly or fully carried out by the ECU together with the TCU 50. In the process B, the TCU 50 also determines, in parallel to the respective steps S200 to S260, whether the condition for temporarily stopping the engine operation is continuously satisfied or not.

When the condition for temporarily stopping the engine operation is continuously satisfied, the respective steps S200 to S260 of the process B are successively carried out. On the other hand, when the condition for temporarily stopping the engine operation is no longer satisfied, the process goes to a step S300.

At the step S300, the respective steps S200 to S260 of the process B are stopped and the following steps are carried out instead.

In a case that the engine operation is re-started after the temporal stop of the engine operation, the oil pressure applied to the vehicle-starting gear-change element 5d is controlled at a value higher than a predetermined pressure, while the oil pressure to be applied to the other gear-change elements than the vehicle-starting gear-change element 5d is controlled at a value lower than a predetermined pressure.

In addition, the step of the process B (one of S200 to S260), which is stopped because of the re-start of the engine operation, is memorized in a memory device of the TCU 50.

After the above steps are carried out in the step S300, the process goes to the step S400 (FIG. 3C).

At the step S400, the engine operation is re-started according to the idling-stop function. Then, the process goes to a step S410, at which the operation of the electrical pump 11 is stopped. At a next step S420, the vehicle is operated by the vehicle driver so that the vehicle starts its movement.

At a step S430, the vehicle is operated by the vehicle driver to its stopped condition and then the engine operation is temporarily stopped according to the idling-stop function. Then, the processes A and B (more exactly, processes A2 and B2 in FIGS. 3A and 3B) are carried out again in this order.

In the process B2, the process is started again from such a step of the process B1 of a previous cycle, which was stopped and memorized in the memory device in the previous cycle.

In a case that any one of the steps S200 to S260 was stopped in the process B1 of the previous cycle, the following process is carried out in the process B2 of the current cycle.

When the process B1 was stopped in the previous cycle, the process B1 was in the following condition. Namely, the process B1 was stopped because the engine operation was once stopped but re-started thereafter. When the engine operation was stopped, the process B1 was started and one of the gear-change elements 5a to 5e was selected for updating the current-command characteristic thereof. However, when the engine operation was re-started before completing the updating process for all of the electromagnetic valves 35a to 35e and the gear-change elements 5a to 5e, the supply of the oil pressure from the selected electromagnetic valve (one of 35a to 35e) to the selected gear-change element (one of 5a to 5e) was cut off. As a result, the updating process for such selected gear-change element was not yet completed in the process B1 of the previous cycle.

Therefore, in the process B2 of the current cycle, which is carried out when the engine operation is re-started and stopped again (the steps S400 to S430), the oil pressure is produced by the electrical pump 11 and the oil pressure is supplied to the electromagnetic valve (one of 35a to 35e) corresponding to the selected gear-change element (one of 5a to 5e), for which any one of the steps of the process B1 was stopped in the previous cycle. In addition, the command value for the drive current is supplied to the corresponding driver circuit 50c in order to adjust the oil pressure produced by the selected electromagnetic valve. Then, the oil-pressure detecting device 54 detects the oil pressure applied to the selected gear-change element in order to obtain the detection value for the oil pressure.

The current-command characteristic for the selected gear-change element is finally updated in the process B2 based on the command value for the drive current and the detection value for the oil pressure.

When the engine operation is re-started at a step S440, the process goes to a step S450 at which the operation of the electrical pump 11 is stopped. The vehicle moves again at a step S460.

The vehicle is stopped at a step S470 and the shift-range selecting lever 30 is moved to the position of the P-range or the N-range at a step S480. When the ignition switch is turned off at a step S490, the engine operation is finally stopped.

Figure 4A:
Figure 4B:
Figure 4C:
Figure 4D:
Figure 4E:
Figure 4F:
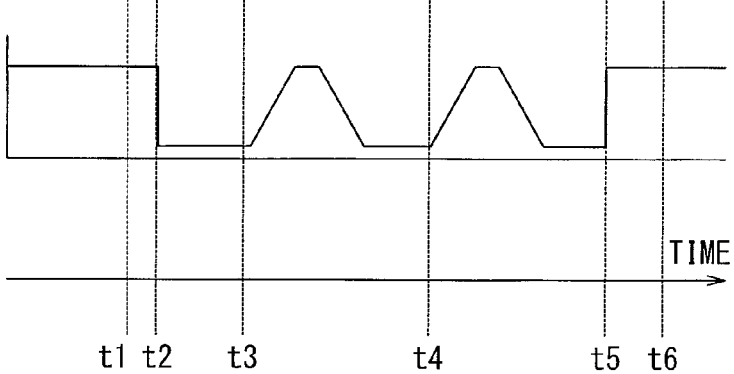

FIGS. 4A to 4F show the change of the oil pressure detected by the oil-pressure detecting device 54 and so on, when the engine is temporarily stopped and the oil pressure control apparatus 1 is operated in accordance with the flow-charts of FIGS. 3A to 3C. More exactly, each of FIGS. 4A to 4F shows changes of rotational speeds and the oil pressures in terms of time. Namely, FIG. 4A shows the rotational speed of the engine when the engine operation is once stopped and re-started, FIG. 4B shows the rotational speed of the electrical pump 11, FIG. 4C shows the oil pressure applied to the vehicle-starting gear-change element 5d, FIG. 4D shows the oil pressure applied to the selected gear-change element (the first selected gear-change element), FIG. 4E shows the oil pressure applied to another selected gear-change element (the second selected gear-change element), and FIG. 4F shows the oil pressure detected by the oil-pressure detecting device 54.

The operation of the electrical pump 11 is started at a timing t1, when the condition for temporarily stopping the engine operation is satisfied. The rotational speed of the electrical pump 11 is thereby increased (FIG. 4B). When the rotational speed of the electrical pump 11 reaches a predetermined value, the engine operation is stopped at a timing t2 (FIG. 4A).

When the engine operation is stopped at the timing t2, the operation of the mechanical pump 10 is also stopped (FIG. 4A). Therefore, the oil pressure applied by the mechanical pump 10 to the vehicle-starting gear-change element 5d becomes zero. However, the oil pressure, which is larger than the initial spring force of the spring 8, is supplied to the same gear-change element 5d from the electrical pump 11 which is already in its operation.

FIG. 4C shows the oil pressure applied to the vehicle-starting gear-change element, which corresponds to the forward-travel gear-change element 5d, in the case that the vehicle moves in the forward direction.

As shown in FIG. 4D, the oil pressure applied to the first selected gear-change element (for example, the gear-change element 5c) is increased at a timing t3 from zero to a predetermined value with a predetermined temporal change rate and then decreased to zero with another predetermined temporal change rate.

Thereafter, another gear-change element (for example, the gear-change element 5b) is selected as the second selected gear-change element. And in the same manner to the first selected gear-change element (5c), the oil pressure applied to the second selected gear-change element (5b) is increased at a timing t4 from zero to the predetermined value with the predetermined temporal change rate and then the oil pressure is decreased to zero with the predetermined temporal change rate, as shown in FIG. 4E.

In the above operation, the oil pressure applied to the gear-change elements (for example, 5a and 5e) other than the above first and the second selected gear-change elements (for example, 5c and 5b) and the vehicle-starting gear-change element 5d is controlled at zero.

When the TCU 50 determines thereafter (a timing t5) that the condition for temporarily stopping the engine operation is no longer satisfied, the engine operation is re-started, as shown in FIG. 4A. Therefore, the rotational speed of the engine is increased, the rotational speed of the mechanical pump 10 is correspondingly increased, and the oil pressure applied to the vehicle-starting gear-change element 5d is increased (FIG. 4C). After a predetermined time passes by, the operation of the electrical pump 11 is stopped at a timing t6, as shown in FIG. 4B.

In the above operation, since the maximum oil pressure among the oil pressures applied to the gear-change elements 5a to 5e is applied to the oil-pressure detecting device 54, the detection value for the oil pressure is changed in terms of time, as shown in FIG. 4F.

(Advantages of the Embodiment)

(1) In the oil pressure control apparatus 1 according to the present embodiment, the oil pressure is produced by the electrical pump 11 when the engine operation is stopped and such oil pressure is supplied to the electromagnetic valve (35a to 35e) corresponding to the selected gear-change element (5a to 5e). At the same time, the command value for the drive current is supplied to the driver circuit 50c corresponding to the selected electromagnetic valve in order to adjust the oil pressure outputted therefrom depending on the command value. The oil-pressure detecting device 54 detects the oil pressure applied to the selected gear-change element (5a to 5e) to thereby obtain the detection value for the oil pressure.

The current-command characteristic is then updated based on the command value for the drive current and the detection value for the oil pressure.

Figure 5:
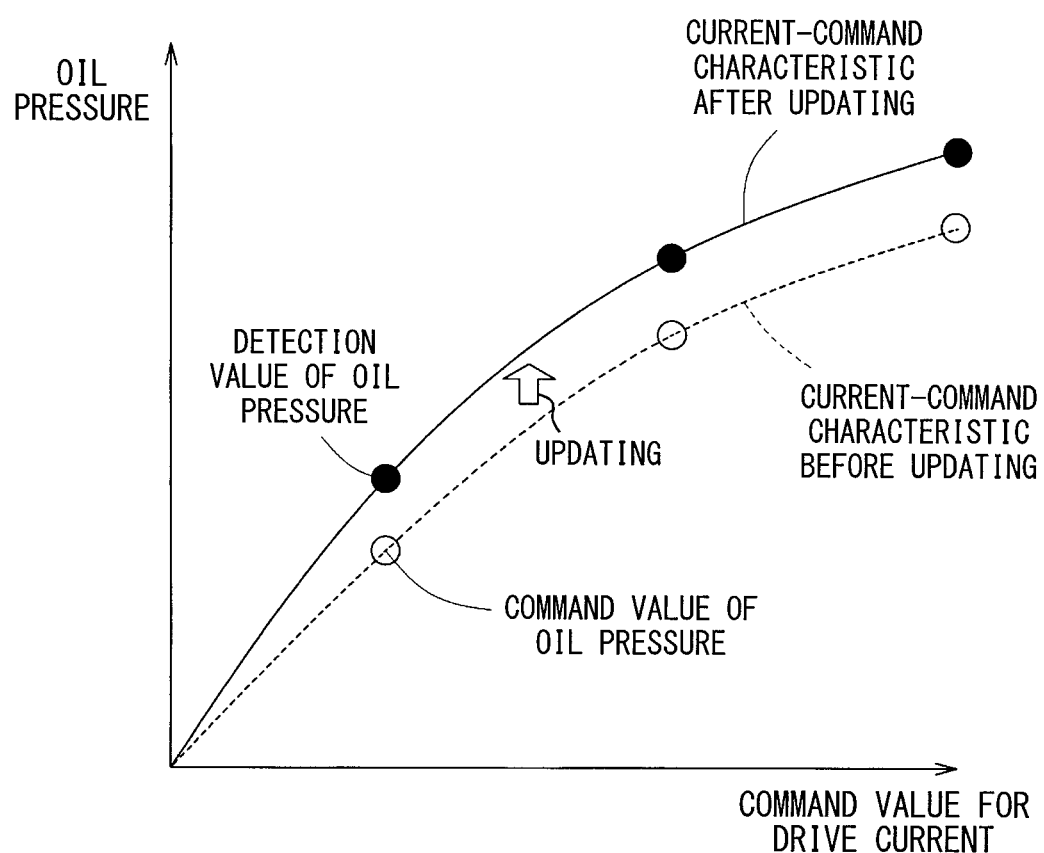
FIG. 5 is a graph for explaining an updating of a current-command characteristic.

An example for updating the current-command characteristic is shown in FIG. 5. In FIG. 5, a dotted line indicates the current-command characteristic before updating and a solid line indicates the current-command characteristic after updating. Values of the oil pressure between respective measuring points (indicated by black points and white points) in each of the current-command characteristics are supplemented by a liner interpolation method, an approximate-curve interpolation method or the like.

As above, it is possible to obtain the data relating to the command value for the drive current and the detection value for the oil pressure by use of the electrical pump 11 and the oil-pressure detecting device 54 during the engine operation is stopped. In addition, it is possible to update the current-command characteristic based on the above collected data. The data obtained during the engine operation is stopped are those data collected in the static condition. Therefore, it is possible to increase the reliability of the updated current-command characteristic, when the current-command characteristic is updated based on the above data.

In the oil pressure control apparatus 1, according to which the oil pressure to be applied to the gear-change elements 5a to 5e of the automatic transmission apparatus 2 is controlled, deviation for the oil pressure is not increased even when the deterioration with age inevitably occurs, because the data relating to the command value for the drive current and the detection value for the oil pressure are collected during the stop of the engine operation and the current-command characteristic is updated based on such data. As a result, the gear-change shock can be made smaller.

(2) In addition, the unintentional power transmission can be avoided in the automatic transmission apparatus 2 during the process of collecting the data relating to the command value of the drive current and the detection value of the oil pressure, because the data are collected during the engine operation is stopped. As a result, it is possible to collect the data in safety.

In addition, when the engine operation is temporarily stopped because of the idling-stop function, the shift-range selecting lever 30 is in the position of the D-range (or the R-range). Therefore, the gear-change elements and the electromagnetic valves are in the condition that the oil pressure can be supplied to the electromagnetic valves and the oil pressure to the gear-change elements can be adjusted. As a result, it is possible to collect the data even during the engine operation is temporarily stopped because of the idling-stop function.

(3) In the oil pressure control apparatus 1 of the present embodiment, the multiple shuttle ball valves 53 are provided in the hydraulic circuit 52 so that the maximum oil pressure among the oil pressures to be applied to the respective gear-change elements 5a to 5e can be introduced to the oil-pressure detecting device 54.

According to such a structure, it is possible to detect by one oil-pressure detecting device 54 the oil pressure applied to the multiple gear-change elements 5a to 5e.

In other words, since the oil-pressure detecting device 54 is commonly used for all of the gear-change elements 5a to 5e, it is possible to reduce the number of the oil-pressure detecting devices to a minimum number.

(4) In the oil pressure control apparatus 1 of the present embodiment, one of the gear-change elements 5a to 5e is selected and the oil pressure applied to the selected gear-change element is made higher than the oil pressure to be applied to non-selected gear-change elements during the engine operation is stopped.

According to such a structure and/or operation, it is possible to surely introduce the oil pressure applied to the selected gear-change element to the oil-pressure detecting device 54.

As a result, it is possible to detect by the oil-pressure detecting device 54 the oil pressure applied to the selected gear-change element and to update the current-command characteristic for the selected gear-change element based on such detection values of the oil pressure.

(5) In the oil pressure control apparatus 1 of the present embodiment, the selected gear-change element is successively changed from one to the other in the order of the frequency of use.

According to such a structure and/or operation, it is possible to update the current-command characteristic for all of the gear-change elements in accordance with the frequency of use.

(6) In the oil pressure control apparatus 1 of the present embodiment, the command value for the drive current to be supplied to the driver circuit 50c, which drives the corresponding electromagnetic valve during the stop of the engine operation, is changed in the term of time, so that the detection value for the oil pressure is monotonically increased or decreased in the term of time.

The change rate in terms of time of the detection value for the oil pressure, which is temporally increased or decreased, is smaller than the predetermined value.

As a result, it is possible to change the oil pressure with an appropriate change rate, for which viscosity of the working oil is taken into consideration. It is, therefore, possible to continuously collect the data relating to the detection value of the oil pressure and to adjust a time required for the data collection.

(7) In the oil pressure control apparatus 1 of the present embodiment, the oil-temperature detecting device 55 is provided for detecting temperature of the working oil which is supplied to the gear-change elements.

It is possible to update the current-command characteristic for each temperature of the working oil.

In the oil pressure control apparatus 1 of the present embodiment, the current-command characteristic is updated when the temperature of the working oil detected by the oil-temperature detecting device 55 becomes higher than a predetermined value.

In other words, the current-command characteristic is not updated when the temperature of the working oil is lower than the predetermined value.

For example, when the temperature of the working oil is lower than −10° C., the viscosity of the working oil is high. Therefore, strictness for the detection value of the oil pressure is low. If the current-command characteristic was updated based on such detection value of the oil pressure, the updating may be carried out based on inaccurate data. Therefore, the current-command characteristic cannot be correctly carried out.

(8) In the oil pressure control apparatus 1 of the present embodiment, the manual valve 13 is provided, by which the gear-change positions of the automatic transmission apparatus 2 is selected.

The automatic transmission apparatus 2 has the forward-travel gear-change elements 5b, 5c and 5d, to which the oil pressure is applied only when the gear-change position of the D-range is selected by the manual valve 13. The automatic transmission apparatus 2 also has the backward-travel gear-change element 5e, to which the oil pressure is applied only when the gear-change position of the R-range is selected by the manual valve 13.

The engine operation is temporarily stopped by the idling-stop function, when the gear-change position of the D-range is selected by the manual valve 13 and the vehicle speed is lower than the predetermined value. In addition, the engine operation can be temporarily stopped by the idling-stop function, when the gear-change position of the R-range is selected by the manual valve 13 and the vehicle speed is lower than the predetermined value.

According to the above operation, it is possible to stop the engine operation when the gear-change position of the R-range is selected by the manual valve 13, even though the oil pressure is applied to the backward-travel gear-change element 5e only when the gear-change position of the R-range is selected by the manual valve 13. As a result, it becomes possible to update the current-command characteristic for the backward-travel gear-change element 5e by use of the idling-stop function.

(9) In the oil pressure control apparatus 1 of the present embodiment, the automatic transmission apparatus 2 has the vehicle-starting gear-change element 5d, which is one of the forward-travel gear-change elements and which is operated when the vehicle starts its forward movement from the stopped condition.

The vehicle-starting gear-change element 5d has the piston 8 and the return spring 48, as below.

The piston 8 pushes the multiple friction elements 47a and 47b, to which the oil pressure adjusted by the forward-travel electromagnetic valve 35d (the vehicle-starting electromagnetic valve 35d) is applied, in the direction for engaging them to one another.

The return spring 48 biases the piston 8 in the direction for releasing the engagement among the multiple friction elements 47a and 47b.

The oil pressure applied to the piston 8 of the vehicle-starting gear-change element 5d is not smaller the initial spring force of the return spring 48 during the vehicle stopped condition. The initial spring force corresponds to the biasing force of the return spring 48 applied to the piston 8, when the oil pressure from the forward-travel electromagnetic valve 35d (the vehicle-starting electromagnetic valve 35d) is not applied to the vehicle-starting gear-change element 5d.

As a result, since the oil pressure of the predetermined value is applied to the piston 8 of the vehicle-starting gear-change element 5d in advance, it is possible for the piston 8 to rapidly carry out its initial movement. Therefore, the vehicle can smoothly start its forward movement.

(10) In the oil pressure control apparatus 1 of the present embodiment, the automatic transmission apparatus 2 has the vehicle-starting gear-change element 5d, which is operated when the vehicle starts its forward movement from its stopped condition.

The oil pressure applied to the vehicle-starting gear-change element 5d is controlled at the value higher than the predetermined value, while the oil pressure applied to the remaining gear-change elements is controlled at the value lower than the predetermined value, when the engine operation is re-started after the temporal stop thereof.

According to the above structure and operation, it is possible to rapidly realize the operating condition in which only the vehicle-starting gear-change element 5d is brought into the engaged condition, when the engine operation is actually re-started. Therefore, it is possible to rapidly start the vehicle forward movement.

(11) In the oil pressure control apparatus 1 of the present embodiment, when the engine operation is re-started after the temporal stop thereof, the supply of the working oil from the corresponding electromagnetic valve to the gear-change element selected for the purpose of updating the current-command characteristic thereof is cut off. Therefore, the process for updating the current-command characteristic is not completed.

When the engine operation is stopped again (S430), the oil pressure is produced by the electrical pump 11 and such oil pressure is supplied to the corresponding electromagnetic valve. At the same time, the command value for the drive current is supplied to the driver circuit 50c for driving the corresponding electromagnetic valve, so that the oil pressure outputted from the electromagnetic valve is adjusted depending on the command value for the drive current. The adjusted oil pressure, which is applied to the selected gear-change element, is detected by the oil-pressure detecting device 54. As above, the detection value for the oil pressure is obtained.

Then, the current-command characteristic is updated based on the command value for the drive current and the detection value for the oil pressure, for such gear-change element for which the process for updating the current-command characteristic is not completed in the previous process B1.

As above, it is possible to collect the data for the selected gear-change element relating to the command value for the drive current and the detection value for the oil pressure, when the engine operation is temporarily stopped after the re-start thereof.

As a result, it is not necessary to carry out the updating process for all of the gear-change elements from the very beginning thereof. Instead, it is possible to start the updating process from a middle point, at which the updating process is temporarily stopped in the previous cycle (in the previous process B1) because of the re-start of the engine after the temporal stop of the engine operation. Namely, in the next process B2, it is possible to start again the process for collecting the data from the selected gear-change element, for which the collection of the data was not completed in the previous cycle. Accordingly, it is possible to eliminate useless data collection and to complete the process for updating the current-command characteristic for all of the gear-change elements.

(12) In the oil pressure control apparatus 1 of the present embodiment, when the detection value for the oil pressure is out of the predetermined pressure range, the TCU 50 determines that any malfunction has occurred in any one of parts and/or components for the automatic transmission apparatus 2. Therefore, it is possible to detect any possible occurrence of the malfunction and to deal with such malfunction.
(Modifications)

The present disclosure can be modified in various manners without departing from a spirit of the present disclosure.

Figure 6A:
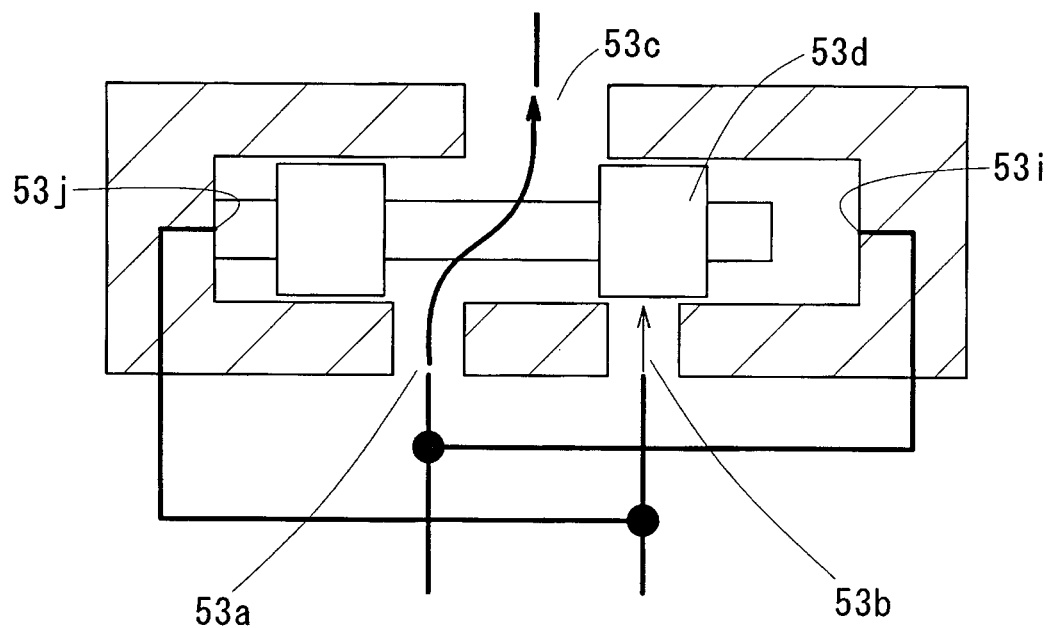
FIGS. 6A and 6B are schematic cross sectional views showing a spool valve according to a modification of the present disclosure.
Figure 6B:
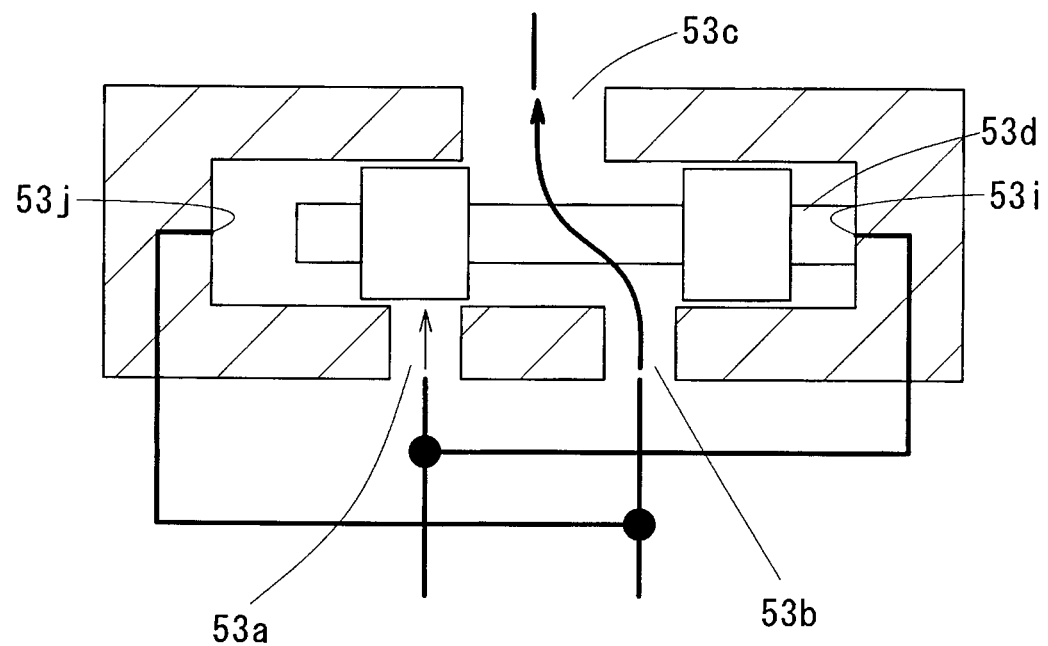

(M1) For example, in the above embodiment, the shuttle ball valve 53 is provided as the oil-pressure selecting device. However, a spool valve may be also used as the oil-pressure selecting device, as shown in FIGS. 6A and 6B. In the drawings, the same reference numerals are given to such portions, which are the same or similar to those of the above embodiment.

In the spool valve, inlet ports 53i and 53j are formed in addition to the inlet ports 53a and 53b, so that each of the oil pressures from the inlet ports 53i and 53j is applied to the valve member 53d in an axial direction opposing to each other. As a result, the valve member 53d is moved in the direction of the lower oil pressure. As a result, one of the inlet ports 53a and 53b, the oil pressure of which is lower than that of the other inlet port 53a or 53b, is closed.

As shown in FIGS. 6A and 6B, the oil pressure of the inlet port 53i and the oil pressure of the inlet port 53a are equal to each other, because the working oil is respectively introduced from the same oil passage (one of 40 to 44). In the same way, the oil pressure of the inlet port 53j and the oil pressure of the inlet port 53b are equal to each other.

FIG. 6A shows a condition that the oil pressure of the inlet port 53a is higher than that of the inlet port 53b, while FIG. 6B shows a condition that the oil pressure of the inlet port 53b is higher than that of the inlet port 53a.

(M2) In the above embodiment, the electrical pump 11 is provided as the second source of the oil pressure. However, for example, an accumulator may be used as the second source of the oil pressure in place of the electrical pump 11.

(M3) In the above embodiment, the operation of the oil pressure control apparatus is explained in the case that the shift-range selecting lever is positioned in gear-change position of the D-range at the step S120 of FIG. 3A. However, the same advantages can be obtained when the process for updating the current-command characteristic is carried out in a case that the shift-range selecting lever is positioned in the R-range. In this case, the backward-travel gear-change element 5e works as the vehicle-starting gear-change element.

What is claimed is:
1. An oil pressure control apparatus, which controls oil pressure of working oil to be supplied to gear-change elements of an automatic transmission apparatus for a vehicle, comprising;
   a mechanical pump driven by an engine of the vehicle and producing the oil pressure;
   multiple electromagnetic valves respectively connected to each of the gear-change elements so as to adjust the oil pressure produced by the mechanical pump and to output such adjusted oil pressure to the corresponding gear-change elements;
   an oil-pressure command portion for obtaining a command value of the oil pressure to be applied to each of the gear-change elements;
   a drive-current command portion for outputting a command value of a drive current to a driver circuit for each of the electromagnetic valves, wherein the drive-current command portion has a current-command characteristic for each of the electromagnetic valves and calculating the command value of the drive current by applying the command value of the oil pressure to the current-command characteristic, and wherein the current-command characteristic corresponds to a correlation between the command value of the drive current and the command value of the oil pressure;
   a second oil-pressure source for producing the oil pressure without depending on an operation of the engine in order to supply the oil pressure of the second oil-pressure source to the electromagnetic valves;
   an oil-pressure detecting device for detecting oil pressure of the working oil applied to the gear-change elements; and
   a control unit which includes the oil-pressure command portion and the drive-current command portion,
   wherein the control unit operates the second oil-pressure source in order to produce the oil pressure during the engine is stopped and to supply the oil pressure to the electromagnetic valves,
   wherein the control unit supplies the command value of the drive current from the drive-current command portion to the driver circuit in order that the electromagnetic valves adjust the oil pressure to be applied to the gear-change elements, wherein the control unit obtains a detection value of the oil pressure applied to the gear-change elements, based on detection by the oil-pressure detecting device, and wherein the control unit updates the current-command characteristic based on the command value of the drive current and the detection value of the oil pressure, during the engine is stopped.

2. The oil pressure control apparatus according to claim 1, further comprising;

a hydraulic circuit for supplying the oil pressure of the second oil-pressure source to each of the gear-change elements via the respective electromagnetic valves, the hydraulic circuit including multiple oil passages each of which connects one of the electromagnetic valves to corresponding one of the gear-change elements; and multiple oil-pressure selecting devices, each of which is provided between respective two of the oil passages so that the oil pressure of each of the two oil passages is introduced to the oil-pressure selecting device, wherein each of the oil-pressure selecting devices selects the oil pressure of one of the oil passages which is higher than that of the other oil passage, and wherein the oil-pressure selecting device of a most-downstream side outputs a selected oil pressure to the oil-pressure detecting device, wherein the oil-pressure selecting device comprises;

a first and a second inlet ports, to each of which two of the oil passages are respectively connected, so that the oil pressure of each oil passage applied to the corresponding gear-change element is introduced to the first and the second inlet ports;

an outlet port for outputting the selected oil pressure, which is selected from the oil pressures respectively introduced to the first and the second inlet ports; and a valve member, to which the oil pressures respectively introduced to the first and the second inlet ports are applied in directions different from each other, wherein the valve member is moved by a difference of the oil pressures respectively introduced to the first and the second inlet ports so as to output from the outlet port the selected oil pressures, which is higher than the other oil pressure.

3. The oil pressure control apparatus according to claim 2, wherein the multiple oil-pressure selecting devices are arranged in a tournament choice structure in the hydraulic circuit, so that the oil-pressure selecting device of the most-downstream side selects a maximum oil pressure among the oil pressures respectively applied to each of the gear-change elements, and the oil-pressure selecting device of the most-downstream side outputs the maximum oil pressure to the oil-pressure detecting device.

4. The oil pressure control apparatus according to claim 3, wherein the control unit selects one of the gear-change elements when the engine is stopped, and the oil pressure applied to the gear-change element selected by the control unit is controlled at a value, which is higher than the oil pressure applied to any one of the remaining gear-change elements.

5. The oil pressure control apparatus according to claim 2, wherein the oil-pressure selecting device is composed of a shuttle ball valve.

6. The oil pressure control apparatus according to claim 2, wherein the oil-pressure selecting device is composed of a spool valve.

7. The oil pressure control apparatus according to claim 1, wherein the command value for the drive current, which is supplied to the driver circuit during the engine is stopped, is changed in terms of time, in such a manner that the detection value of the oil pressure is monotonically increased or decreased in terms of time, a rate of change with time for the detection value of the oil pressure is smaller than a first predetermined value, in a case that the oil pressure is monotonically increased, and a rate of change with time for the detection value of the oil pressure is smaller than a second predetermined value, in a case that the oil pressure is monotonically decreased.

8. The oil pressure control apparatus according to claim 1, further comprising;

an oil-temperature detecting device for detecting temperature of the working oil supplied to the gear-change elements.

9. The oil pressure control apparatus according to claim 8, wherein the current-command characteristic is updated, when the temperature of the working oil detected by the oil-temperature detecting device is higher than a predetermined value.

10. The oil pressure control apparatus according to claim 1, further comprising;

a shift-range selecting unit, which is configured to be operated by a vehicle driver, for selecting one of gear-change positions of the automatic transmission apparatus, wherein the gear-change elements are composed of;

forward-travel gear-change elements, to which the oil pressure is applied only when a gear-change position of a vehicle forward movement is selected by the shift-range selecting unit; and a backward-travel gear-change element, to which the oil pressure is applied only when a gear-change position of a vehicle backward movement is selected by the shift-range selecting unit, wherein the engine is temporarily stopped because of an idling-stop function, when the gear-change position of the vehicle forward movement is selected by the shift-range selecting unit and a vehicle speed is lower than a first predetermined value, and wherein the engine is temporarily stopped because of the idling-stop function, when the gear-change position of the vehicle backward movement is selected by the shift-range selecting unit and the vehicle speed is lower than a second predetermined value.

11. The oil pressure control apparatus according to claim 1, wherein the gear-change elements include a vehicle-starting gear-change element, which is operated when the vehicle starts its forward movement from its stopped condition, and the vehicle-starting gear-change element comprises;

a piston for pushing multiple friction elements in a direction for engaging them with each other, when the oil pressure adjusted by a corresponding electromagnetic valve is applied to the vehicle-starting gear-change element; and a return spring for biasing the piston in a direction for dis-engaging them from each other, wherein the oil pressure to be applied to the piston is not lower than an initial spring force during the engine is stopped, wherein the initial spring force corresponds to a biasing force of the return spring applied to the piston when the oil pressure is not applied to the vehicle-starting gear-change element from the corresponding electromagnetic valve.

12. The oil pressure control apparatus according to claim 4, wherein
the gear-change element selected by the control unit for updating the current-command characteristic is successively changed to a different gear-change element.

13. The oil pressure control apparatus according to claim 12, wherein
the gear-change element is successively selected for updating the current-command characteristic in an order of frequency of use.

14. The oil pressure control apparatus according to claim 1, wherein
the gear-change elements include a vehicle-starting gear-change element, which is operated when the vehicle starts its forward movement from its stopped condition, and
the oil pressure to be applied to the vehicle-starting gear-change element is adjusted at a pressure higher than a predetermined value, while the oil pressure to be applied to the remaining gear-change elements is controlled at a pressure lower than the predetermined value, when the engine is re-started after its temporal stop.

15. The oil pressure control apparatus according to claim 1, wherein
in a case that one of the gear-change elements is selected for the purpose of updating the current-command characteristic thereof during the engine is temporarily stopped, a supply of the working oil to such selected gear-change element is thereafter cut off because the engine is re-started after its temporal stop, and the current-command characteristic is not updated for such selected gear-change element,
the control unit operates the second oil-pressure source so as to produce the oil pressure when the engine is stopped again after its re-start,
the control unit operates the second oil-pressure source so as to apply the oil pressure to the electromagnetic valve corresponding to the selected gear-change element, for which the current-command characteristic is not updated,
the control unit supplies the command value for the drive current to the driver circuit corresponding to the selected gear-change element, so that the oil pressure to be outputted from the electromagnetic valve is adjusted and applied to the selected gear-change element,
the oil-pressure detecting device detects the oil pressure applied to the selected gear-change element so as to obtain the detection value of the oil pressure, and
the control unit updates the current-command characteristic for the selected gear-change element based on the command value of the drive current and the detection value of the oil pressure.

16. The oil pressure control apparatus according to claim 1, wherein
the control unit determines that a malfunction has occurred in any of parts and/or components of the automatic transmission apparatus, when the detection value of the oil pressure is out of a predetermined pressure range, and
the control unit deals with the malfunction.

17. The oil pressure control apparatus according to claim 1, wherein
the second oil-pressure source is composed of an electrical pump or an accumulator.

* * * * *